United States Patent
Kottikulam et al.

(10) Patent No.: US 9,609,264 B2
(45) Date of Patent: Mar. 28, 2017

(54) METHOD AND SYSTEM FOR FAIL-SAFE PROGRAM RECORDING IN PERSONAL VIDEO RECORDERS

(71) Applicants: Mohammed Junaid Kottikulam, Kasaragod (IN); Dhanya Unnikrishnan, Thrissur (IN); Saira Thampi, Perumbavoor (IN)

(72) Inventors: Mohammed Junaid Kottikulam, Kasaragod (IN); Dhanya Unnikrishnan, Thrissur (IN); Saira Thampi, Perumbavoor (IN)

(73) Assignee: WIPRO LIMITED, Bangalore (IN)

( * ) Notice: Subject to any disclaimer, the term of this patent is extended or adjusted under 35 U.S.C. 154(b) by 582 days.

(21) Appl. No.: 14/011,207

(22) Filed: Aug. 27, 2013

(65) Prior Publication Data
US 2015/0010292 A1 Jan. 8, 2015

(30) Foreign Application Priority Data
Jul. 3, 2013 (IN) .......................... 2947/CHE/2013

(51) Int. Cl.
| H04N 5/76 | (2006.01) |
|---|---|
| H04N 5/94 | (2006.01) |
| H04N 5/765 | (2006.01) |
| H04N 21/4147 | (2011.01) |
| H04N 21/433 | (2011.01) |
| H04N 21/442 | (2011.01) |
| H04N 21/462 | (2011.01) |
| H04N 21/472 | (2011.01) |
| H04N 21/63 | (2011.01) |

(52) U.S. Cl.
CPC ......... *H04N 5/765* (2013.01); *H04N 21/4147* (2013.01); *H04N 21/4334* (2013.01); *H04N 21/4424* (2013.01); *H04N 21/4622* (2013.01); *H04N 21/47214* (2013.01); *H04N 21/632* (2013.01)

(58) Field of Classification Search
None
See application file for complete search history.

(56) References Cited

U.S. PATENT DOCUMENTS

| 8,006,275 B1 | 8/2011 | Poole et al. |
| 8,103,777 B2 | 1/2012 | Verhaegh et al. |
| 2004/0052504 A1 | 3/2004 | Yamada et al. |

(Continued)

*Primary Examiner* — Heather Jones
(74) *Attorney, Agent, or Firm* — Finnegan, Henderson, Farabow, Garrett & Dunner LLP

(57) ABSTRACT

A method, system, and non-transitory computer-readable storage medium for implementing backup recording of events are disclosed. The method may include detecting, by a personal video recorder (PVR) cluster coordinator, an interruption in a current or scheduled recording of an event at a first PVR. The method may further include determining, by the PVR cluster coordinator, a PVR cluster corresponding to the first PVR in response to the detection, the PVR cluster comprising a plurality of PVRs and including the first PVR. The method may further include facilitating, by the PVR cluster coordinator, a backup recording of the interrupted recording at a serving PVR in the PVR cluster after determining the PVR cluster corresponding to the first PVR. Further, the PVR cluster coordinator may be implemented by at least one computer processor.

20 Claims, 12 Drawing Sheets

(56) References Cited

U.S. PATENT DOCUMENTS

| | | | |
|---|---|---|---|
| 2005/0160308 A1* | 7/2005 | Elcock | G11B 27/36 714/5.1 |
| 2006/0008243 A1 | 1/2006 | Przybylek | |
| 2007/0039033 A1 | 2/2007 | Ota | |
| 2009/0217332 A1* | 8/2009 | Hindle | H04N 5/782 725/109 |
| 2011/0047579 A1 | 2/2011 | Westbrook et al. | |
| 2011/0191769 A1* | 8/2011 | Brunet | G06F 9/445 717/176 |

* cited by examiner

METHOD AND SYSTEM FOR FAIL-SAFE PROGRAM RECORDING IN PERSONAL VIDEO RECORDERS

CROSS-REFERENCE TO RELATED PATENT APPLICATION

The present application claims priority under 35 U.S.C. §119 to Indian Patent Application No. 2947/CHE/2013, filed Jul. 3, 2013, and entitled "METHOD AND SYSTEM FOR FAIL-SAFE PROGRAM RECORDING IN PERSONAL VIDEO RECORDERS." The aforementioned application is incorporated herein by reference in its entirety.

TECHNICAL FIELD

The disclosure generally relates to personal video recorders or digital video recorders, and more particularly to fail-safe program recording in such recorders.

BACKGROUND

With the entry of Personal Video Recorders (PVRs) (also referred to as Digital Video Recorders (DVRs)), recording of program has become a ubiquitous feature in Digital Television (TV) domain. For example, many cable or Internet Protocol TV (IPTV) users who subscribe to a variety of TV channels record different programs broadcast over these TV channels for later viewing. Over the years, apart from the basic recording and playback functionalities, significant technological advancement has taken place in the area of PVRs. For example, advanced features like trick mode, live-pause, etc., have been added to PVR systems.

Despite these advancements, it still is very common for a recording to be interrupted and left incomplete or not started at all due to external and internal events beyond the user's control. Examples of such events may include the PVR losing power, insufficient signal strength of a broadcast channel, storage failure, etc. The recording failures may result in no recording or only an incomplete recording being available for future viewing, causing user dissatisfaction. In such circumstances, the user may attempt to access their missed programs on advanced services, like Video-on-Demand (VOD) and Catch-Up TV. Alternatively, the user may try browsing the electronic programming guide (EPG) to find the alternate instance (rebroadcast) of the program and scheduling it for recording. Alternatively, the user may have to wait until an alternate instance of the program is rebroadcasted to watch or re-record the program, which may or may not happen. VOD, Catch-Up TV, etc., are advanced technologies, which the service provider may or may not support, and whether a program will become rebroadcast will depend on the broadcaster. Because these situations are beyond the control of the user, the probability of missing the desired program increases.

Accordingly, a need exists for techniques that enable the user to complete recordings of desired programs despite the occurrence of an interruption.

SUMMARY

According to a first aspect of the disclosure, a method of implementing backup recording of events is disclosed. The method may include detecting, by a personal video recorder (PVR) cluster coordinator, an interruption in a current or scheduled recording of an event at a first PVR. The method may further include determining, by the PVR cluster coordinator, a PVR cluster corresponding to the first PVR in response to the detection, the PVR cluster comprising a plurality of PVRs and including the first PVR. The method may further include facilitating, by the PVR cluster coordinator, a backup recording of the interrupted recording at a serving PVR in the PVR cluster after determining the PVR cluster corresponding to the first PVR. Further, the PVR cluster coordinator may be implemented by at least one computer processor.

According to a second aspect of the disclosure, a non-transitory computer-readable storage medium storing instructions for enabling a computer to implement a method of backup recording of events is disclosed. The method may include detecting, by a personal video recorder (PVR) cluster coordinator, an interruption in a current or scheduled recording of an event at a first PVR. The method may further include determining, by the PVR cluster coordinator, a PVR cluster corresponding to the first PVR in response to the detection, the PVR cluster comprising a plurality of PVRs and including the first PVR. The method may further include facilitating, by the PVR cluster coordinator, a backup recording of the interrupted recording at a serving PVR in the PVR cluster after determining the PVR cluster corresponding to the first PVR.

According to a third aspect of the disclosure, a system for implementing backup recording of events is disclosed. The system may include one or more hardware processors; and a memory storing instructions for execution by the one or more hardware processors. The one or more hardware processors may be configured by the instructions to detect an interruption in a recording of an event at a first PVR. The one or more hardware processors may be further configured to determine a PVR cluster corresponding to the first PVR in response to the detection, the PVR cluster comprising a plurality of PVRs and including the first PVR. The one or more hardware processors may be further configured to facilitate backup recording of the interrupted recording at a serving PVR in the PVR cluster after determining the PVR cluster corresponding to the first PVR.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Exemplary embodiments of the present disclosure will be described with reference to the accompanying drawings. Wherever convenient, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
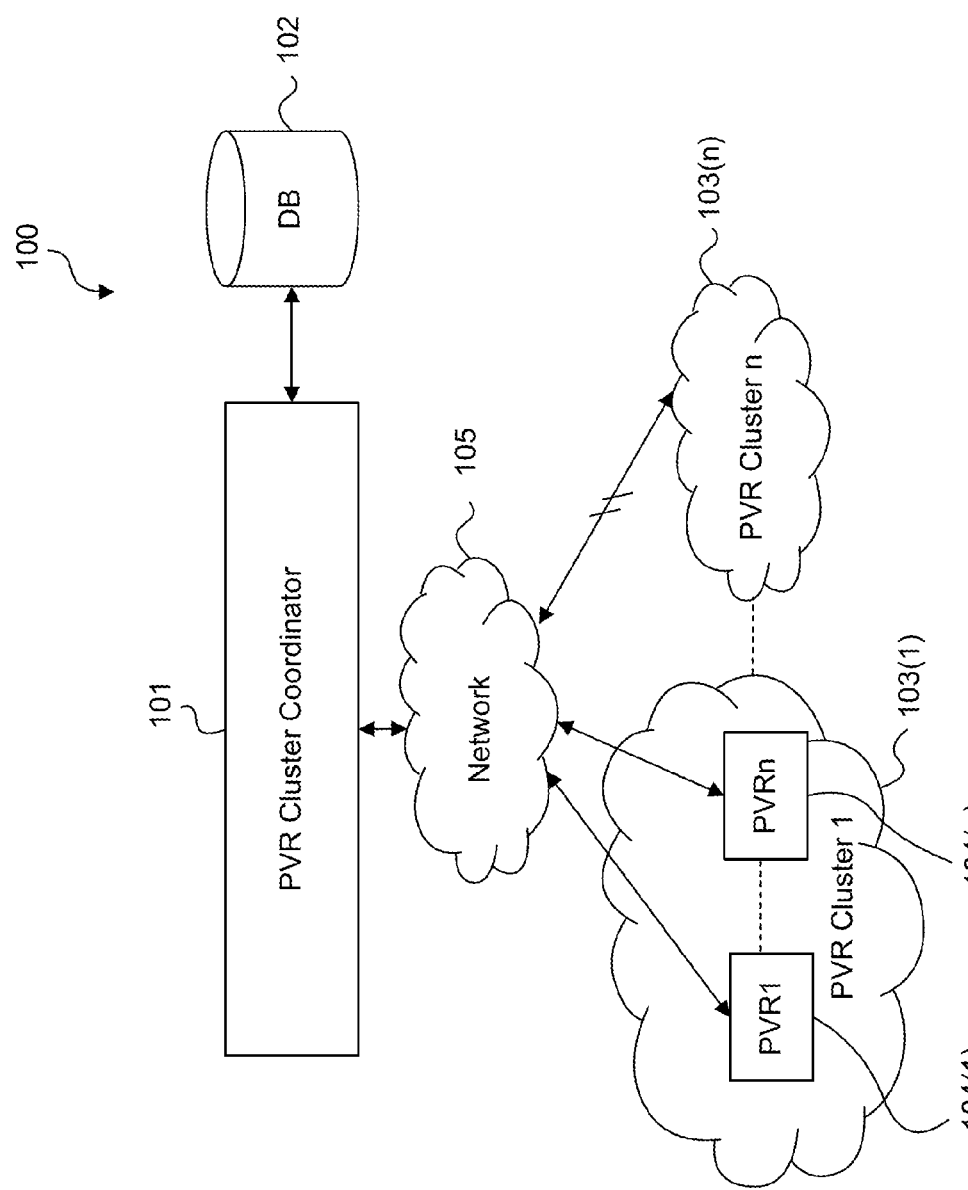
FIG. 1 illustrates an exemplary high level system for uninterrupted program recording using collaborative PVRs.

An exemplary high level system 100 for uninterrupted program recording using collaborative PVRs is illustrated in FIG. 1. System 100 may include a PVR cluster coordinator 101, database 102, and one or more PVR clusters 103(1)-(n) (referred to hereinafter as PVR cluster 103). Each of the PVR clusters 103 may include at least two PVRs 104. System 100 may further include a network 105.

PVR cluster coordinator 101 may be a centralized server connected via a network (e.g., the Internet) or any other communication medium to the database 102 and/or the PVR clusters 103. According to some embodiments, PVR cluster coordinator 101 may be provided and managed by the service provider who provides PVRs 104(1)-(n) (referred to hereinafter as PVRs 104) to users or subscribers. For example, in the United States, a service provider may be Comcast, Verizon, AT&T, DirecTV, Dish Network, etc. Alternatively, PVR cluster coordinator 101 may be provided and managed by a third party entity that is or is not related to the programming service provider.

Each PVR cluster 103 may be a logical grouping of individual collaborative PVRs 104. A PVR cluster 103 may, for example, include PVRs 104 in the same home or PVRs 104 that are in geographically distinct locations. A PVR 104 may be included in more than one cluster 103. PVR cluster 103 may be created by any PVR user and each cluster 103 may be identified by a unique identifier. For example, a first user of a particular PVR 104 may send a request to his peers to join a PVR cluster and, based on acceptance of such a request, PVRs 104 of the user's peers may join in a cluster 103 created by the first user. For instance, such a request may be sent by the first user to his peers through a website corresponding to PVR cluster coordinator 101, a website provided by the service provider who provides the PVR 104, or through any other means. In other embodiments, PVR clusters 103 may be established by the service provider with or without authorization from the subscriber. In establishing PVR clusters 103, the service provider may consider forming clusters of PVRs 104 that subscribe to the same or substantially overlapping programming services. In other embodiments, clusters 103 may be formed based on the geographical location of PVRs 104. For example, clusters 103 may be formed from PVRs 104 that are within a certain geographical area, such as the same state, same city, same zipcode, etc. In other embodiments, a subscriber may register his/her PVR 104 with an existing cluster 103 by requesting access to that cluster from other members of the cluster or, in some embodiments, without requesting access to that cluster. It will be noted that each of clusters 103 may be connected to each other directly or through PVR cluster coordinator 101. An exemplary communication medium between clusters 103 may be the Internet.

Each of PVRs 104 in clusters 103 may share with PVR cluster coordinator 101 all their recording information such as scheduled recording, recording start message, recording complete message, recording deletion message, scheduled recording cancellation etc. The recording information may be stored in database 102 or in a memory internal to PVR cluster coordinator 101. In some embodiments, database 102 may be internal to PVR cluster coordinator 101. Sharing the recording information may assist PVR cluster coordinator 101 in keeping track of recording related activities at individual PVRs 104. When a recording at a first PVR 104 of a first cluster 103 is interrupted (the first PVR 104 will be referred to hereinafter as the "interrupted PVR") or fails due to an external or internal event, the recording may be initiated on a second PVR 104 (also referred to as the "serving PVR") in the first cluster 103 by PVR cluster coordinator 101. Once the event is resolved (for example, the interrupted recording is completed at the serving PVR 104), the interrupted PVR 104 may obtain access to the recording from the serving PVR 104. Thereby, system 100 may provide for uninterrupted program recording using collaborative PVRs 104. Further details on the operation of system 100 is provided next beginning with FIGS. 2 and 3 that describe in detail PVR cluster coordinator 101. PVR 104 is described in detail with reference to FIG. 4.

Network 105 may represent any form or medium of digital data communication. Examples of network 105 may include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, network 105 may also include one or more mobile device networks, such as a GSM network or a PCS network, that allow mobile devices to send and receive data via applicable communications protocols, including those described above. While a network 105 is not shown in FIGS. 2-4, it will be understood that a network 105 may be present in the systems illustrated in FIGS. 2-4.

Figure 2:
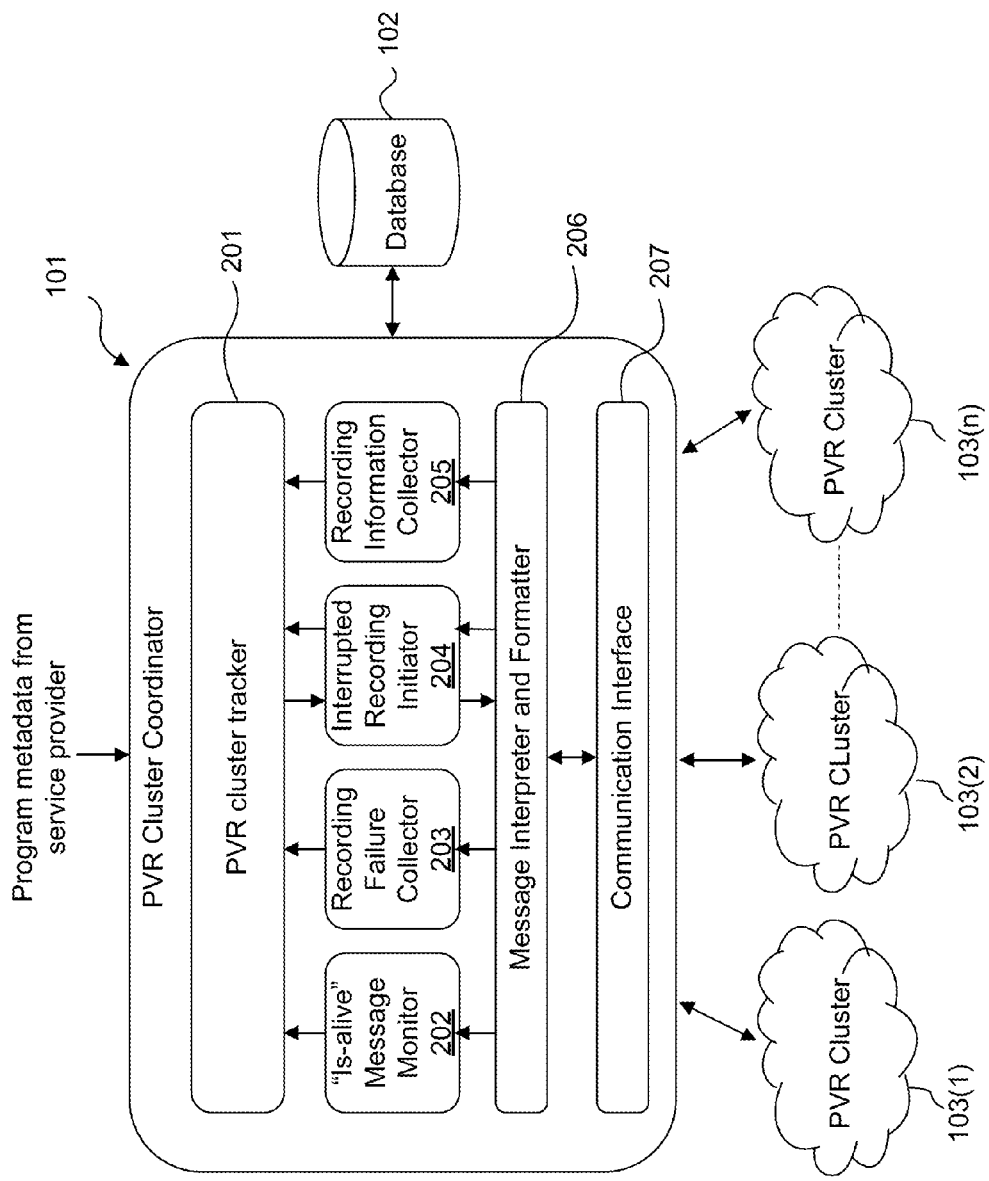
FIG. 2 illustrates an exemplary configuration of a PVR cluster coordinator with an is-alive message monitor.

FIG. 2 illustrates an exemplary configuration of PVR cluster coordinator 101. PVR cluster coordinator 101 may include a PVR cluster tracker 201. PVR cluster tracker 201 may be the core logical component of PVR cluster coordinator 101 and it may drive or monitor one or more of the other components in PVR cluster coordinator 101. PVR cluster tracker 201 may track the status (e.g., "dead" or "alive") of all the PVRs 104 in each cluster 103. Tracker 201 may also store a variety of other information, such as details about active recordings (for example, recordings in progress) at PVRs 104, interrupted recordings, details of serving PVR 104 taking up the interrupted recording of a PVR 104, etc. Tracker 201 may obtain the above information through the other components in PVR cluster coordinator 101 discussed below. Other functions of tracker 201 will be described in conjunction with other components of PVR cluster coordinator 101.

PVR cluster coordinator 101 may further include an is-alive message monitor 202 that may monitor "is alive" messages sent cyclically by PVRs 104. According to some exemplary embodiments, each PVR 104 may periodically send an "is alive" message to indicate its status ("dead" or "alive"). For example, if PVR 104 has gone offline due to an interruption in its Internet or other connection, or due to a power outage, PVR 104 may not send an "is alive" message. In such a scenario, is-alive message monitor 202 may determine that PVR 104 is not alive and report such PVR 104 to PVR cluster tracker 201 as "dead." Upon receiving such a notification from is-alive message monitor 202, PVR cluster tracker 201 may initiate fail-safe recording or backup recording at PVRs 104 in the corresponding cluster 103, if necessary.

PVR cluster coordinator 101 may receive recording failure messages (interchangeably referred to herein as "recording interrupted message") from PVRs 104. For example, PVRs 104 may report a recording failure due to low signal strength of the programming signal, power deactivation of PVR 104, hard disk write failure or other corruption of the storage device in which the program is to be recorded, etc. As explained later, these recording failure messages may be reported by recording interruption detector 401 (FIG. 4) in PVR 104. In PVR cluster coordinator 101, the recording failure messages may be received and collected by recording failure collector 203 and forwarded to PVR cluster tracker 201. According to some embodiments, the recording failure messages may include one or more of the following information:

a. source PVR identifier (for example, a unique identifier of the PVR like a PVR username, IP address, etc.);
b. cluster identifier;
c. type of interruption (power outage, storage failure, power off, etc.);
d. recording details, such as network details, transport stream details, service details, event details, duration of recording remaining, etc.; and
e. type of recording, such as event-based or time-based.

Upon notification of recording interruption from recording failure collector 203 or status notification from is-alive message monitor 202, PVR cluster tracker 201 may recognize an interruption in the recording at one of PVRs 104 and invoke interrupted recording initiator 204, which may be another constituent of PVR cluster coordinator 101. For example, upon interruption of a recording, PVR cluster tracker 201 may determine the destination cluster 103 corresponding to the PVR 104 whose recording has been interrupted. Destination cluster 103 may be the cluster 103 associated with the PVR 104 whose recording has been interrupted. PVR cluster tracker 201 may share information about the interrupted recording, destination cluster 103, alive PVRs 104 in the destination cluster 103, etc., with interrupted recording initiator 204. Interrupted recording initiator 204 may in turn initiate a session with the destination cluster 103 to find a PVR 104 that can take up the interrupted recording.

Initiating a session with destination cluster 103 may involve sending one or more multicast messages to all the other active PVRs 104 in the destination cluster 103 including interrupted recording details, receiving acknowledgement messages from the alive or active PVRs 104 in destination cluster 103, and sending a recording request to a PVR 104 in destination cluster 103 to start the recording. Interrupted recording details may include one or more of network details, transport stream details, service details, event details, duration of recording remaining, tentative storage required to complete the recording, etc. Network details may include at least a network identifier and original network identifier identifying the network in which the transport stream is transmitted. Transport stream details may include transport stream (TS) identifier, which identifies the TS in which the service is transmitted. Service details may include service identifier, service name, etc. that identifies the service in which the event is transmitted. Event details may include event identifier or Content Reference Identifier (GRID may be Digital Video Broadcasting (DVB) standard specific) or event name or any other event related identifier that uniquely identifies the event. It will be noted that "event" may be a broadcast event and may refer to a program that is broadcast via terrestrial, cable, or satellite communication at a certain date and time. Further, an event may also be a broadband event. An example of a broadband event may be a program received by an IPTV.

In response to the multicast message, acknowledgement messages may be received from alive (i.e., active) PVRs 104 in the destination cluster 103. An acknowledgment message from an active PVR 104 may include a notification that the PVR 104 is available to take up the interrupted recording. The acknowledgement message from PVRs 104 in the destination cluster 103 may be forwarded by interrupted recording initiator 204 to cluster tracker 201, which may select a PVR 104 to take up the recording. Once a PVR 104 is selected by tracker 201 to be the serving PVR 104, a recording request may be sent to the serving PVR 104 by interrupted recording initiator 204. PVR cluster tracker 201 may determine the PVR 104 that takes up the interrupted recording in various ways. For example, PVR cluster tracker 201 may select the PVR 104, which responded first with the acknowledgement message. According to another technique, PVR cluster tracker 201 may select the PVR 104 that has a greater probability of completing the interrupted recording successfully. For example, PVR cluster tracker 201 may calculate or keep track of the success rate of recording in each PVR 104 that responded with an acknowledgement message, and use this probability value to assign the recording request to the most successful PVR. In an exemplary embodiment, tracker 201 may calculate or track the success rate of all PVRs 104 whenever a recording is done. Exemplarily, the success rate may be determined using a formula such as the one below:

$$\text{Success rate of recording in a } PVR = \frac{\text{No. of recording successfully completed}}{\text{Total no. of recordings requested}}$$

Under certain circumstances, interrupted recording initiator 204 may not send a multicast message to alive PVRs 104 in destination cluster 103. For example, in case the interrupted recording is already being recorded in another PVR 104 in the destination cluster 103, PVR cluster tracker 201 may simply request that other PVR 104, through interrupted recording initiator 204, to share its recording with the PVR 104 whose recording was interrupted upon completion.

In order for PVR cluster tracker 201 to implement backup recording of an interrupted recording, it may need information regarding the program or event being recorded. Accordingly, PVR cluster coordinator 101 may further include a recording information collector 205 that may collect from each of PVRs 104 recording information, such as the scheduled recording, recording start message, recording complete message, recording deletion message, scheduled recording cancellation, etc. Each of PVRs 104 may share this information on a periodic or non-periodic basis with coordinator 101. The recording information may be stored in database 102 or in a memory internal to PVR cluster coordinator 101. The recording information may be accessed by tracker 201 when initiating a backup recording. Further, tracker 101 may also retrieve program metadata information (including EPG information, service information, etc.) updates from the service provider and utilize the metadata information when initiating a backup recording.

In addition to the above constituents, PVR cluster coordinator 101 may also include a message interpreter and formatter 206 and communication interface 207. Communication interface 207 may be implemented using underlying communication protocols used by PVR cluster coordinator 101 to communicate with external entities such as PVRs 104. Module 206 may interpret any messages received from communication interface 207 and route it to the responsible component of PVR cluster coordinator 101. Module 206 may further format any message to be transmitted by PVR cluster coordinator 101 to PVRs 104 into a particular message format and provide the formatted messages to communication interface 207.

Figure 3:
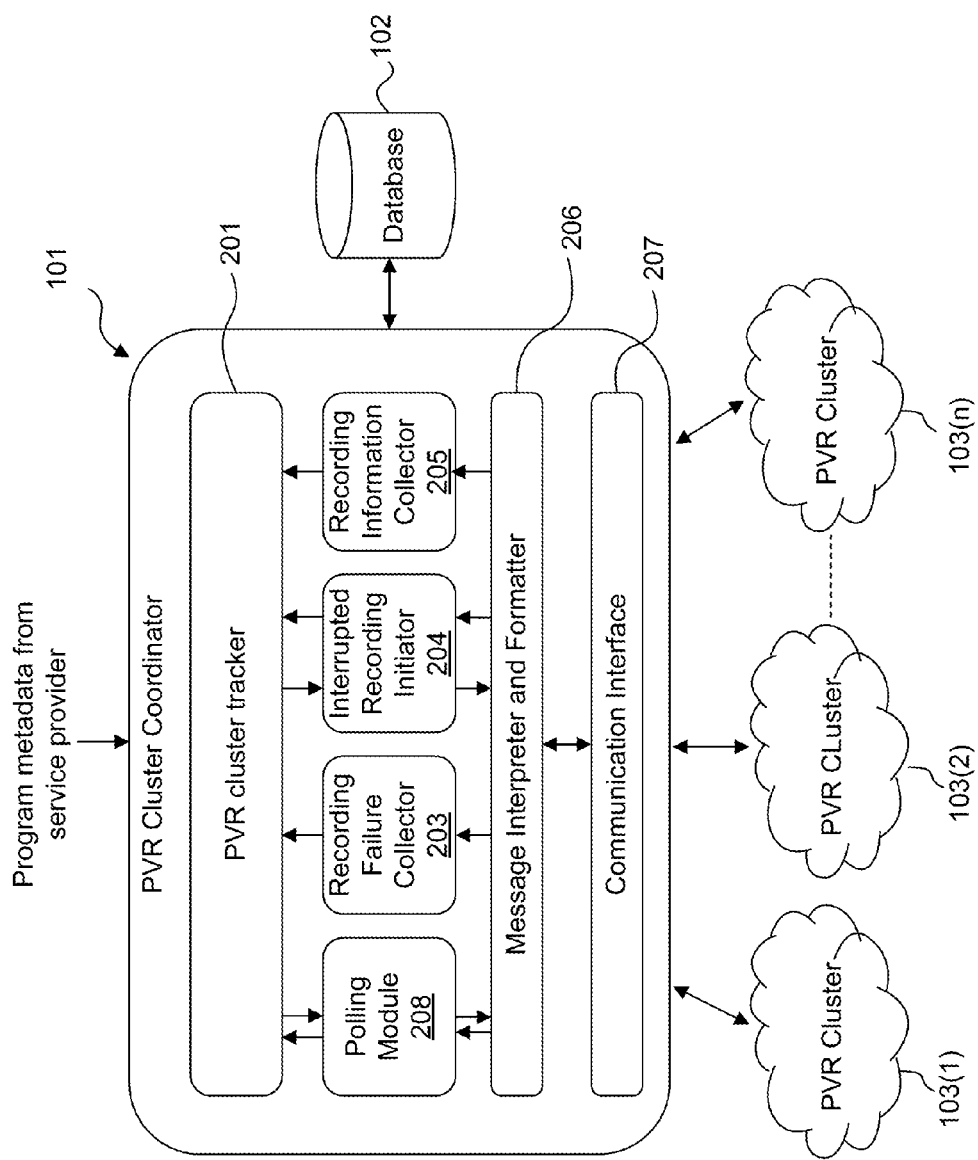
FIG. 3 illustrates another exemplary configuration of a PVR cluster coordinator with a polling module.
Figure 4:
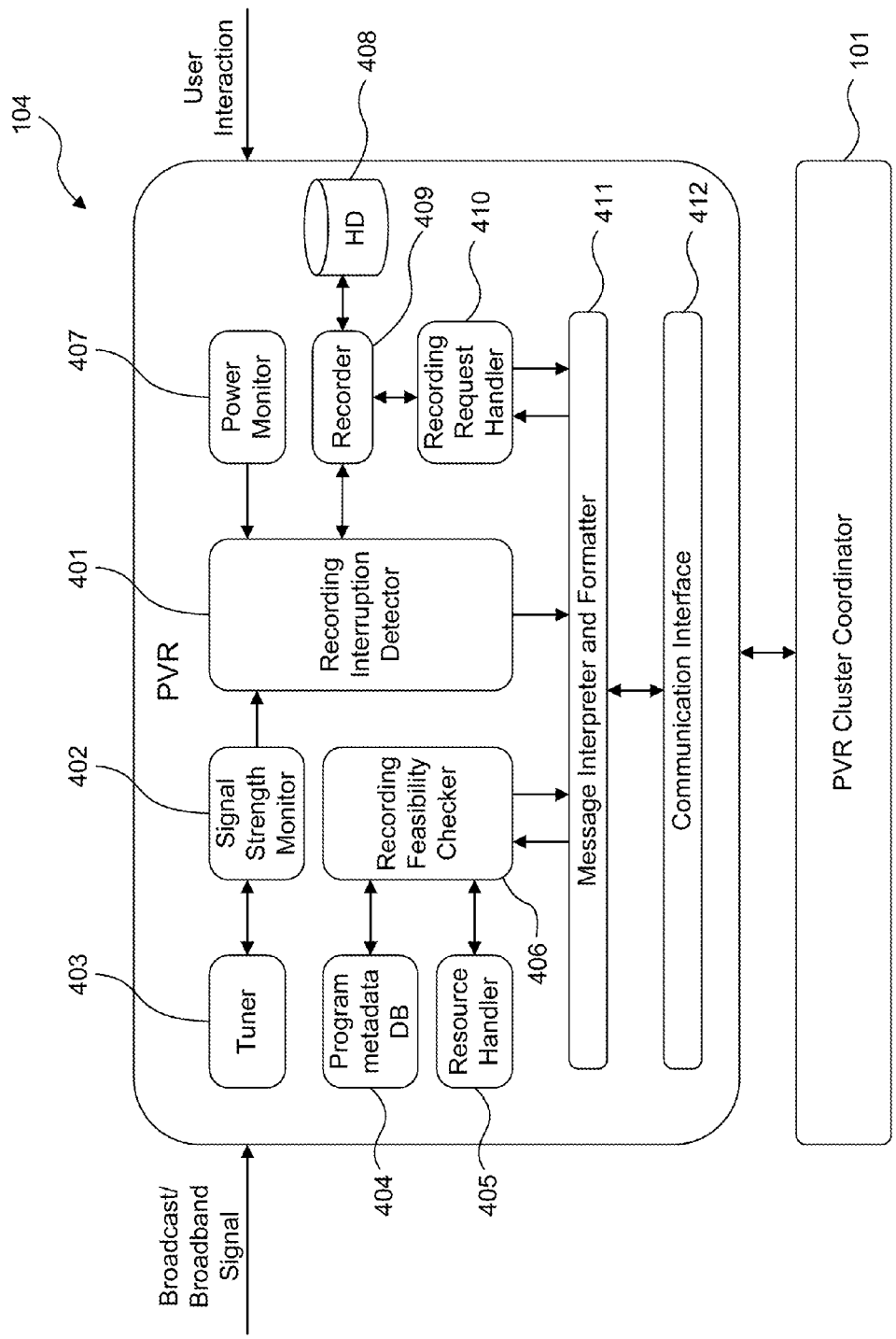
FIG. 4 illustrates an exemplary configuration for a PVR with fail-safe recording capability.

FIG. 3 illustrates an alternative embodiment for PVR cluster coordinator 101. The constituents of coordinator 101 may operate in a manner similar to similarly numbered constituents depicted in FIG. 2, except that a polling module 208 replaces is-alive message monitor 202. Module 208 may periodically send polling messages to PVRs 104 to check whether they are alive. If module 208 does not receive a response or acknowledgement from a PVR 104 in response to the polling messages, module 208 may determine that PVR 104 is not alive and report such PVR 104 to PVR cluster tracker 201 as "dead" or "offline." Upon receiving such a notification from module 208, PVR cluster tracker 201 may initiate fail-safe recording (also referred to as "backup recording") at PVRs 104 in the corresponding cluster 103, if necessary.

While FIGS. 2 and 3 illustrate alternative embodiments of PVR cluster coordinator 101, one with module 208 and one with module 202, it will be noted that in another exemplary embodiment, PVR cluster coordinator 101 may include both modules 208 and 202. Next, a detailed description is provided for PVR 104 with reference to FIG. 4.

PVR 104 may include a recording interruption detector 401 whose functions are described later. PVR 104 may also include a signal strength monitor 402 that may monitor the signal strength of the currently tuned transport stream(s) received by tuner 403. In case the signal strength goes below a predefined threshold, signal strength monitor 402 may report this to recording interruption detector 401. PVR 104 may also include a power monitor 407 that reports power-off activation by the user during a recording or prior to a scheduled recording to interruption detector 401. PVR 104 may further include a recorder 409 that records programs or event in hard disk (HD) 408 of PVR 104. Based on the information from signal strength monitor 402, power monitor 407, and recorder 409, recording interruption detector 401 may detect recording failures and report it to PVR cluster coordinator 101. For example, recording interruption detector 401 may report a recording failure due to low signal strength of the programming signal, power deactivation of PVR 104, hard disk write failure or corruption in which the program is to be recorded, etc. Exemplarily, recording interruption detector 401 may report the recording failure or interruption by sending a recording failure or recording interrupted message, described earlier, to PVR cluster coordinator 101. Recording interruption detector 401 may also stop the recording process in recorder 409 upon detection of failures like low signal strength, power-off, hard disk failures, etc.

PVR 104 may further include a program metadata DB 404, resource handler 405, and recording feasibility checker 406. As explained earlier, upon a recording failure or interruption, PVR cluster coordinator 101 may send out a multicast message to alive PVRs 104 in the destination cluster 103. Checker 406 in each PVR 104 that receives the multicast message may check the feasibility of taking up the interrupted recording and responds to coordinator 101 based on the feasibility check. For example, as part of the multicast message, checker 406 may receive interrupted recording details from coordinator 101 that may include one or more of network details, transport stream details, service details, event details, duration of recording remaining, tentative storage required to complete the recording, etc. Checker 406 may obtain from resource handler 405 resource information, such as availability of free tuner(s), free storage space available, etc. and determine whether taking up the interrupted recording is feasible.

In determining the feasibility of taking up the interrupted recording, checker 406 may also obtain information from program metadata database (DB) 404. Database 404 may have a service database and an electronic programming guide (EPG) database. All service related information may be provided by the service database. Service related information may include information on whether the service that the interrupted recording is running is received by the user, transport stream information, network information, service video resolution, etc. All events (programs) related information may be provided by the EPG database. Event related information may include event duration, event start and end time, unique identifier with respect to the event (like CRID in DVB), etc., that may be provided by EPG database. The service related information and/or event related information may be utilized by checker 406 to determine the feasibility of taking up the recording. Furthermore, recording interruption detector 401 may utilize the service-related information and event-related information when sending a recording failure or recording interrupted message to coordinator 101 in response to a recording failure or interruption.

If coordinator 101 selects the PVR 104 to take up the interrupted recording, recording request handler 410 may receive a backup recording request from PVR cluster coordinator 101 and invoke recorder 409 to start the recording. Handler 410 may also share all recording related information with PVR cluster coordinator 101, such as information on recording start, recording stop, scheduled recording, cancel scheduled recording, etc.

PVR 104 may also include message interpreter and formatter 411 and communication interface 412. Communication interface 412 may be implemented using the underlying communication protocols used by PVR 104 to communicate with external entities such as coordinator 101. Module 411 may interpret any messages received from communication interface 412 and route it to the responsible component of PVR 104. Module 411 may further format any message to be transmitted by PVR 104 to coordinator 101 into a particular message format and provide the formatted messages to communication interface 412. Next, machine algorithms are described in detail that may be implemented by coordinator 101 and PVR 104 under various circumstances according to disclosed embodiments.

Figure 5:
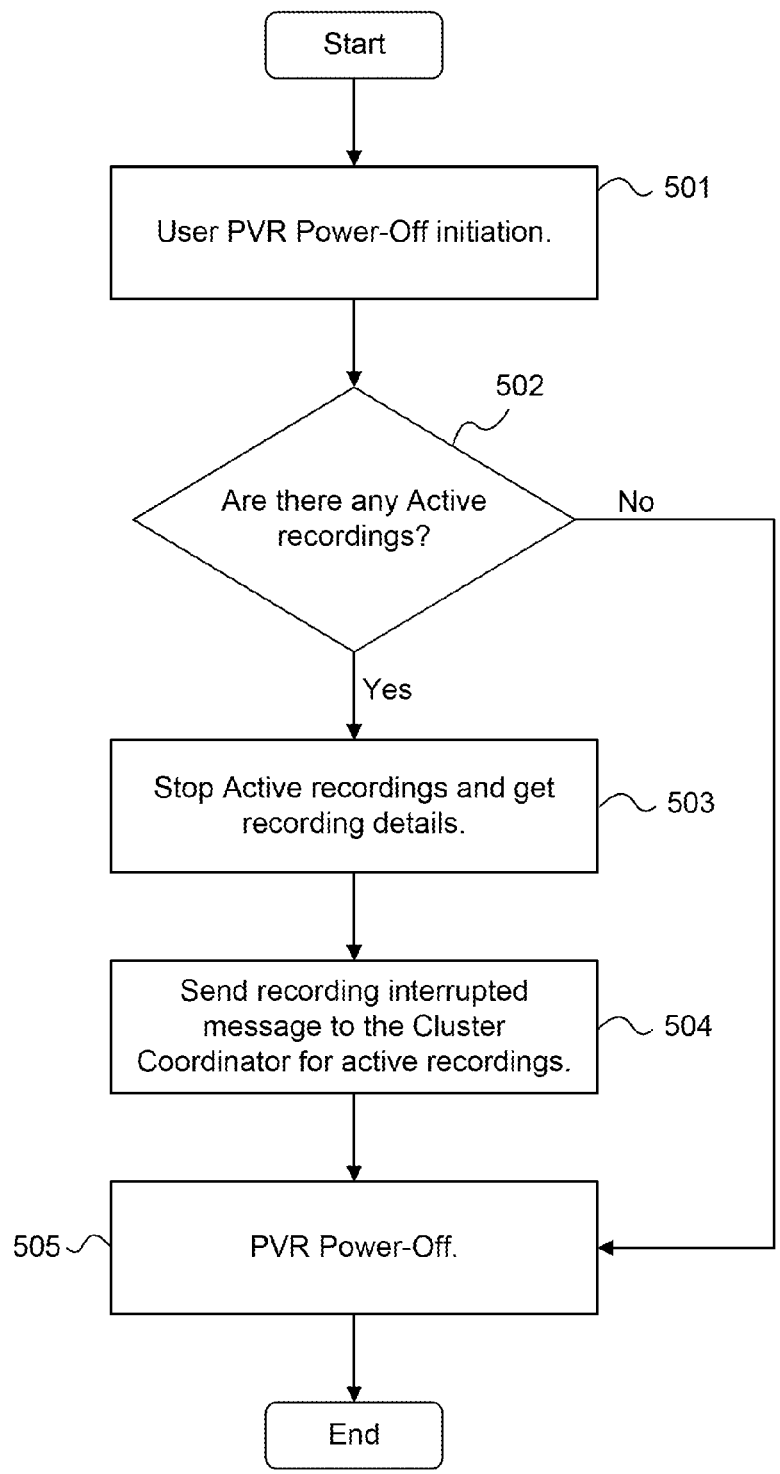
FIG. 5 is an exemplary machine algorithm that may be executed by a PVR in response to a user initiated PVR power-off.

FIG. 5 is an exemplary machine algorithm that may be executed by PVR 104 in response to a user initiated PVR power-off. In step 501, a user may initiate a power-off of a PVR 104. Power monitor 407 may detect the power-off and report the power-off initiation to recording interruption detector 401. In response, recording interruption detector 401 of PVR 104 may check in step 502 whether there are any active or ongoing recordings in PVR 104. If no active recordings are found (step 502; NO), the process may end upon powering off PVR 104 (step 505). However, prior to powering off PVR 104, PVR 104 may send a power-off message to coordinator 101. If one or more active recordings are found (step 502; YES), recording interruption detector 401, in step 503, may stop the active recordings and get recording details from recorder 409 and program metadata database 404. In step 504, recording interruption detector 401 may create and send to coordinator 101 a recording interrupted message indicating a recording interruption or failure. The recording interrupted message may include one or more of the following information:

a. source PVR identifier (for example, a unique identifier of the PVR), such as a PVR username, IP address, etc.;
b. cluster identifier;
c. type of interruption, such as power outage, storage failure, power off, etc.;
d. recording details, such as network details, transport stream details, service details, event details, duration of recording remaining; and
e. type of recording, such as event based or time based.

In step 505, the PVR 104 may be powered off.

Figure 6:
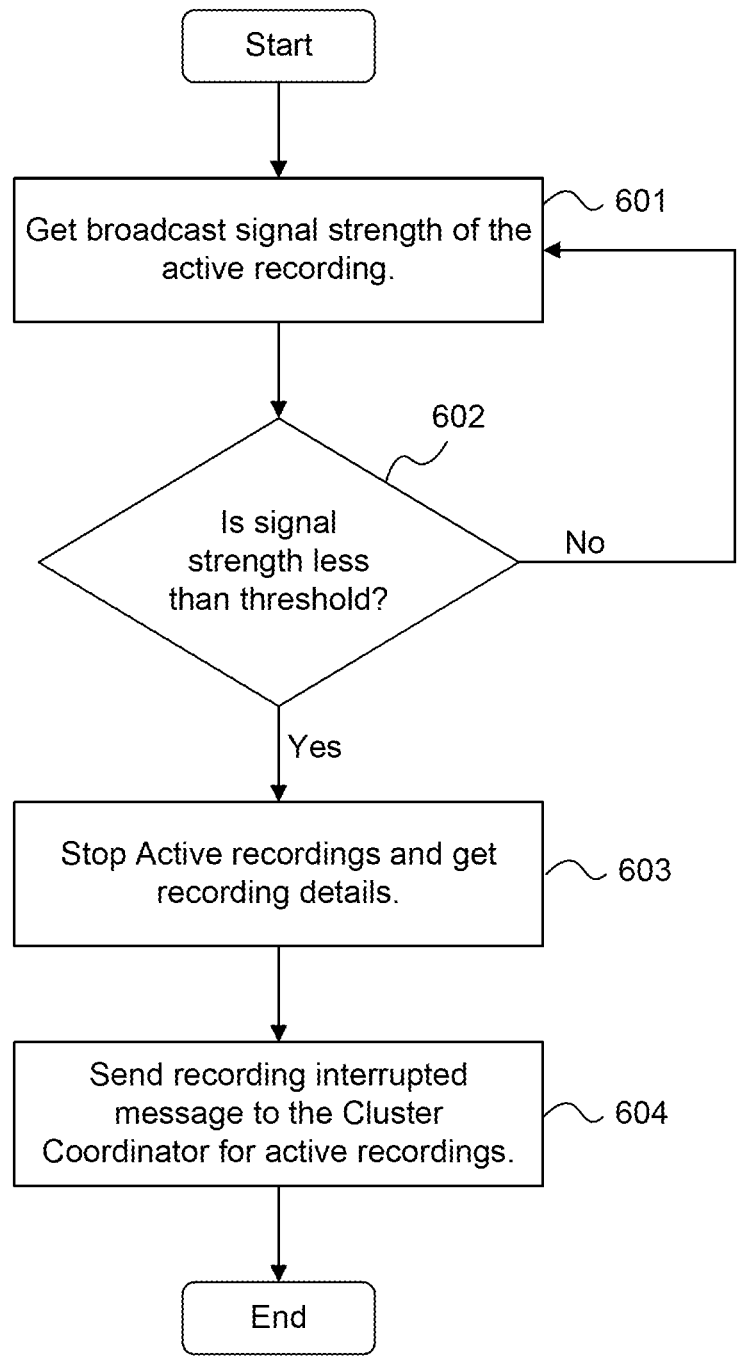
FIG. 6 is an exemplary machine algorithm that may be executed by a PVR in response to a drop/loss in the broadcast signal strength of the transport stream.

FIG. 6 is an exemplary machine algorithm that may be executed by PVR 104 in response to a drop/loss in the broadcast signal strength of the transport stream. In step 601, signal strength monitor 402 may determine the broadcast signal strength of the transport stream associated with an active or ongoing recording. In step 602, signal strength monitor 402 may check if the signal strength is less than a predefined threshold value. If the signal strength is determined to be less than the threshold value (step 602; NO), signal strength monitor 402 may continue to monitor the broadcast signal strength of the transport stream associated with an active or ongoing recording (step 601). Otherwise (step 602; YES), signal strength monitor 402 may report the insufficiency of the signal strength to the recording interruption detector 401. In response, in step 603, recording interruption detector 401 may stop the active recordings and get recording details from recorder 409 and program metadata database 404. In step 604, recording interruption detector 401 may create and send to coordinator 101 a recording interrupted message indicating a recording interruption or failure.

The recording interrupted message may include one or more of the following information:

a. source PVR identifier (for example, a unique identifier of the PVR) like PVR username, IP address, etc.;
b. cluster identifier;
c. type of interruption like power outage, storage failure, power off, etc.;
d. recording details like network details, transport stream details, service details, event details, duration of recording remaining; and
e. type of recording like event based or time based.

Figure 7:
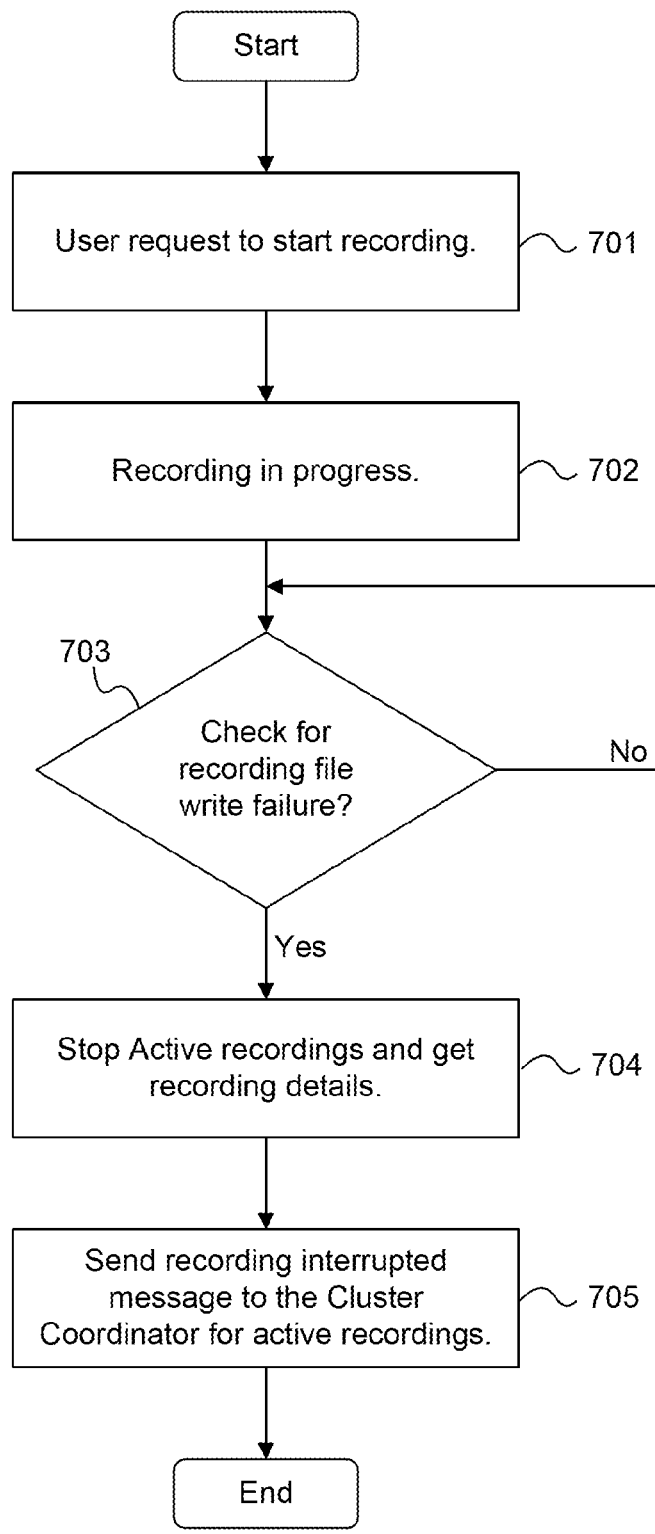
FIG. 7 is an exemplary machine algorithm that may be executed by a PVR in response to a storage or recording write failure.

FIG. 7 is an exemplary machine algorithm that may be implemented by PVR 104 in response to a storage or recording write failure. In step 701, PVR 104 may receive a request from a user to start a recording. In step 702, PVR 104 (and more particularly recorder 409) may record the requested program or event in HD 408. Recorder 409 may check, in step 703, if there was a recording file write failure or write error due to HD failure or corruption. If no write error is detected (step 703; NO), PVR 104 may continue to check for a recording file write failure. Otherwise (step 703; YES), recorder 409 may report the write error to recording interruption detector 401. In response, in step 704, recording interruption detector 401 may stop the active recordings and get recording details from recorder 409 and program metadata database 404. In step 705, recording interruption detector 401 may create and send to coordinator 101 a recording interrupted message indicating a recording interruption or failure.

The recording interrupted message may include one or more of the following information:

a. source PVR identifier (for example, a unique identifier of the PVR), such as PVR username, IP address, etc.;
b. cluster identifier;
c. type of interruption, such as power outage, storage failure, power off, etc.;
d. recording details, such as network details, transport stream details, service details, event details, duration of recording remaining; and
e. type of recording, such as event based or time based.

While FIGS. 5-7 described machine algorithms executed by PVR 104, exemplary machine algorithms executed by PVR cluster coordinator 101 will be described next with reference to FIGS. 8-12.

Figure 8:
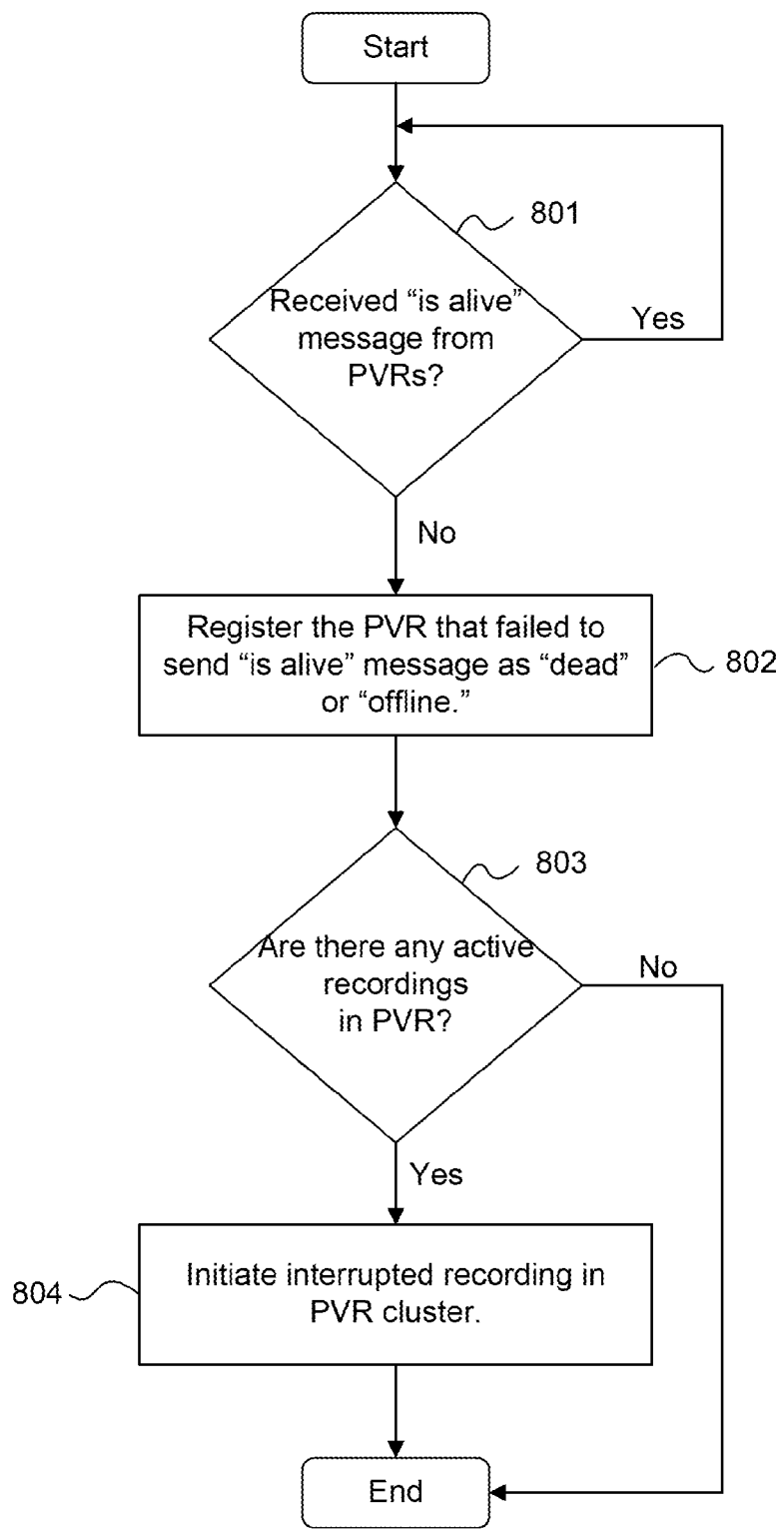
FIGS. 8 and 9 are exemplary machine algorithms that may be executed by the PVR cluster coordinator to detect whether a PVR has become inactive.

FIG. 8 illustrates an exemplary machine algorithm executed by PVR cluster coordinator 101 to detect events like a power outage or any other unforeseen events that cannot be reported by PVR 104 because PVR 104 becomes inactive before being able to report the event. In step 801, is-alive message monitor 202 in coordinator 101 may check periodically if "is alive" messages were received from PVRs 104. According to an exemplary embodiment, each PVR 104 may periodically send an "is alive" message to indicate its status ("dead" or "alive"). For example, if PVR 104 has gone offline due to an interruption in its Internet (or other connection), a power outage, etc., PVR 104 may not send an "is alive" message. If the "is alive" messages are received, monitor 202 may continue to check for the messages. Otherwise, in step 802, is-alive message monitor 202 may determine that PVR 104 is not alive and report such PVR 104 to PVR cluster tracker 201 as "dead" or "offline." In response, PVR cluster tracker 201 may check in step 803 whether the particular PVR 104 has any active recordings. Tracker 201 is able to perform this check because a list of current and future recordings may be locally or externally stored by coordinator 101. In particular, tracker 201 may have access to recording information for PVRs 104, such as scheduled recording, recording start message, recording complete message, recording deletion message, scheduled recording cancellation, etc., and this recording information may be stored in database 102 or in a memory internal to PVR cluster coordinator 101.

If in step 803, tracker 201 determines that there are no active or ongoing recordings in PVR 104 (step 803; NO), the process may end. Otherwise (step 803; YES), in step 804, tracker 201 may recognize an interruption in the recording at the PVR 104 and invoke interrupted recording initiator 204 to initiate the interrupted recording in cluster 103 corresponding to PVR 104. The process of initiating the interrupted recording and implementing a backup of the interrupted recording is explained later with reference to FIGS. 10-12.

Figure 9:
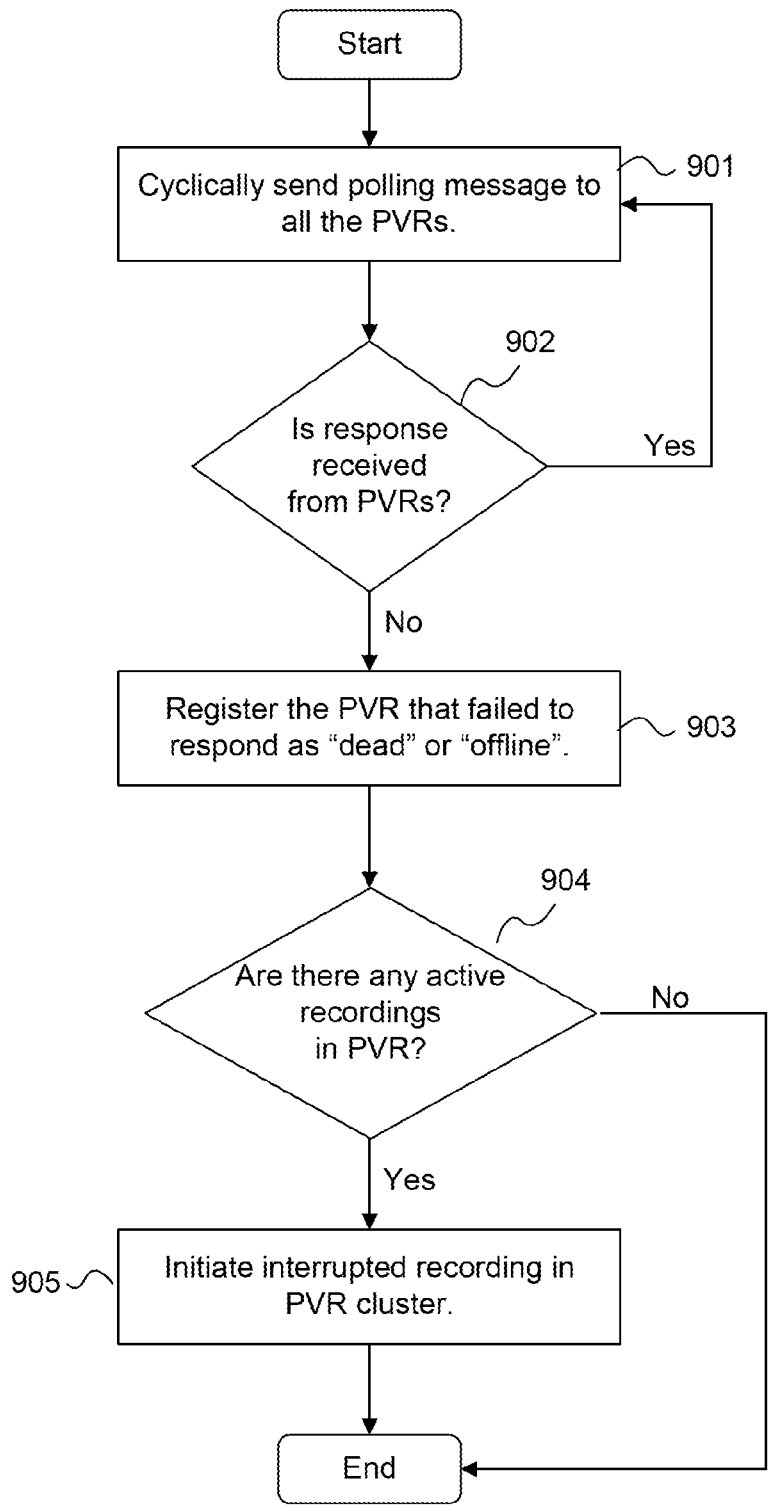

FIG. 9 illustrates another exemplary machine algorithm executed by PVR cluster coordinator 101 to detect events like power outages or any other unforeseen events that cannot be reported by PVR 104 because PVR 104 becomes inactive before being able to report the event. In step 901, polling module 208 may periodically send polling messages to PVRs 104 to check whether they are alive. In step 902, module 208 may check if it received a response or acknowledgement from PVRs 104 in response to the polling messages. If a response is received from each of PVRs 104 (step 902; YES), module 208 may proceed to step 901 and continue sending polling messages. If a response or acknowledgement is not received from a particular PVR 104 (step 902; NO), module 208 may determine that the particular PVR 104 is not alive and report such PVR 104 to PVR cluster tracker 201 as "dead" or "offline" in step 903. For example, if PVR 104 has gone offline due to an interruption in its Internet (or other connection), a power outage, etc., PVR 104 may not send a response or acknowledgment to the polling messages.

In response to reporting a PVR 104 as offline or dead, PVR cluster tracker 201 may check in step 904 whether the particular PVR 104 has any active recordings. Tracker 201 is able to perform this check because a list of current and future recordings may be locally or externally stored by coordinator 101. In particular, tracker 201 may have access to recording information for PVRs 104, such as scheduled recording, recording start message, recording complete message, recording deletion message, scheduled recording cancellation, etc., and this recording information may be stored in database 102 or in a memory internal to PVR cluster coordinator 101. If in step 904, tracker 201 determines that there are no active or ongoing recordings in PVR 104 (step 904; NO), the process may end. Otherwise (step 904; YES), in step 905, tracker 801 may recognize an interruption in the recording at the PVR 104 and invoke interrupted recording initiator 204 to initiate the interrupted recording in cluster 103 corresponding to PVR 104. The process of initiating the interrupted recording and implementing a backup of the interrupted recording is explained next with reference to FIGS. 10-12.

Figure 10:
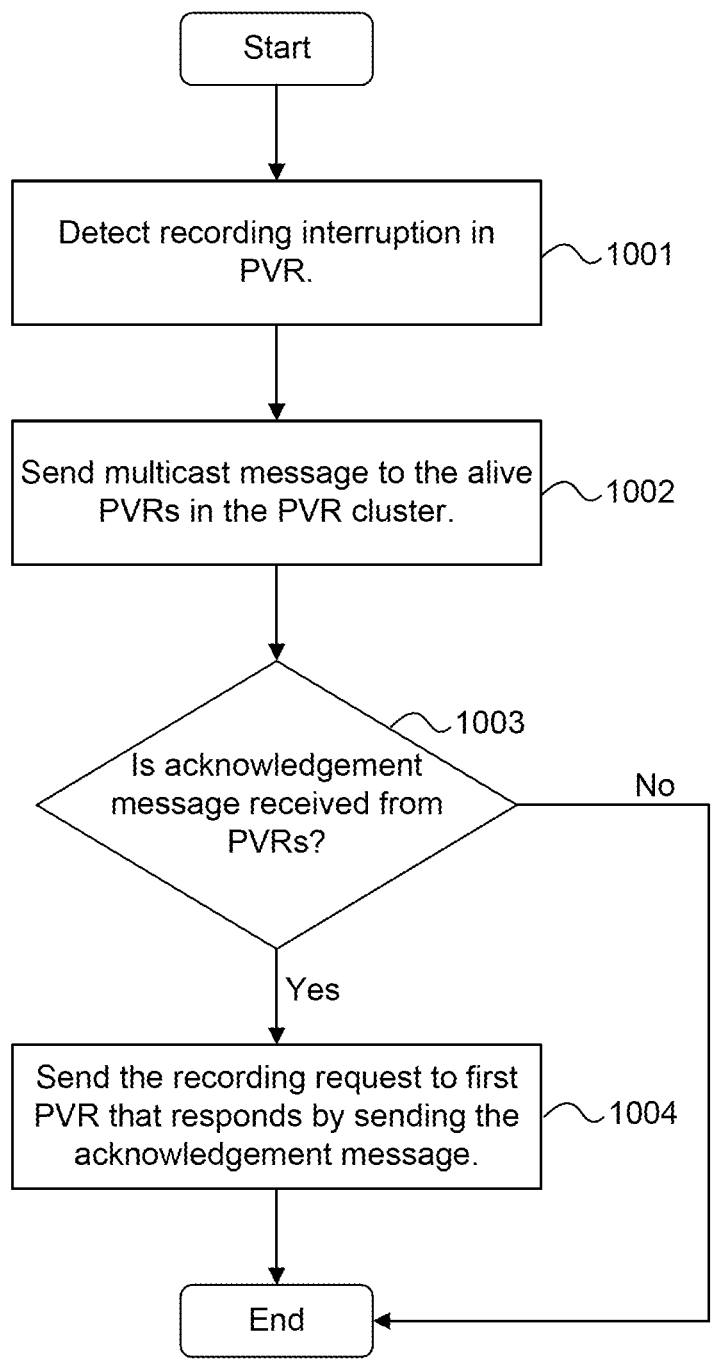
FIGS. 10, 11, and 12 are exemplary machine algorithms that may be executed by the PVR cluster coordinator to implement a backup recording.

FIG. 10 illustrates an exemplary machine algorithm that may be executed by PVR cluster coordinator 101 to implement a backup recording. In step 1001, tracker 201 may receive notification of a recording interruption from is-alive message monitor 202, polling module 208, or recording failure collector 203. In response, tracker 201 may recognize an interruption in the recording at one of PVRs 104 and invoke interrupted recording initiator 204. Further, PVR cluster tracker 201 may determine the destination cluster 103 corresponding to the PVR 104 whose recording has been interrupted. Destination cluster 103 may be the cluster 103 associated with the PVR 104 whose recording has been interrupted. PVR cluster tracker 201 may also share information about the interrupted recording, destination cluster 103, alive PVRs 104 in the destination cluster 103, etc., with interrupted recording initiator 204.

In step 1002, interrupted recording initiator 204 may initiate a session with the destination cluster 103 to find a PVR 104 that can take up the interrupted recording. Initiating a session with destination cluster 103 may involve sending a multicast message to all the other active PVRs 104 in the destination cluster 103, where the multicast message may include interrupted recording details. Interrupted recording details may include one or more of network details, transport stream details, service details, event details, duration of recording remaining, tentative storage required to complete the recording, etc.

In step 1003, interrupted recording initiator 204 may check whether an acknowledgment message has been received from any of the active PVRs 104 in the destination cluster 103. An acknowledgment message from an alive or active PVR 104 may include a notification that the PVR 104 is available to take up the interrupted recording. If no acknowledgment message is received (step 1003; NO), the process may end. If an acknowledgment message is received (step 1003; YES), control may proceed to step 1004, and the acknowledgement message(s) from PVR(s) 104 in destination cluster 103 may be forwarded by interrupted recording initiator 204 to cluster tracker 201, which may select a PVR 104 to take up the recording. In step 1004, PVR cluster tracker 201 may select as the serving PVR 104 the PVR 104 that responded first with the acknowledgement message. Once the serving PVR 104 is selected by cluster tracker 201, interrupted recording initiator 204 may send a recording request to the selected PVR 104 to take up the interrupted recording.

Figure 11:
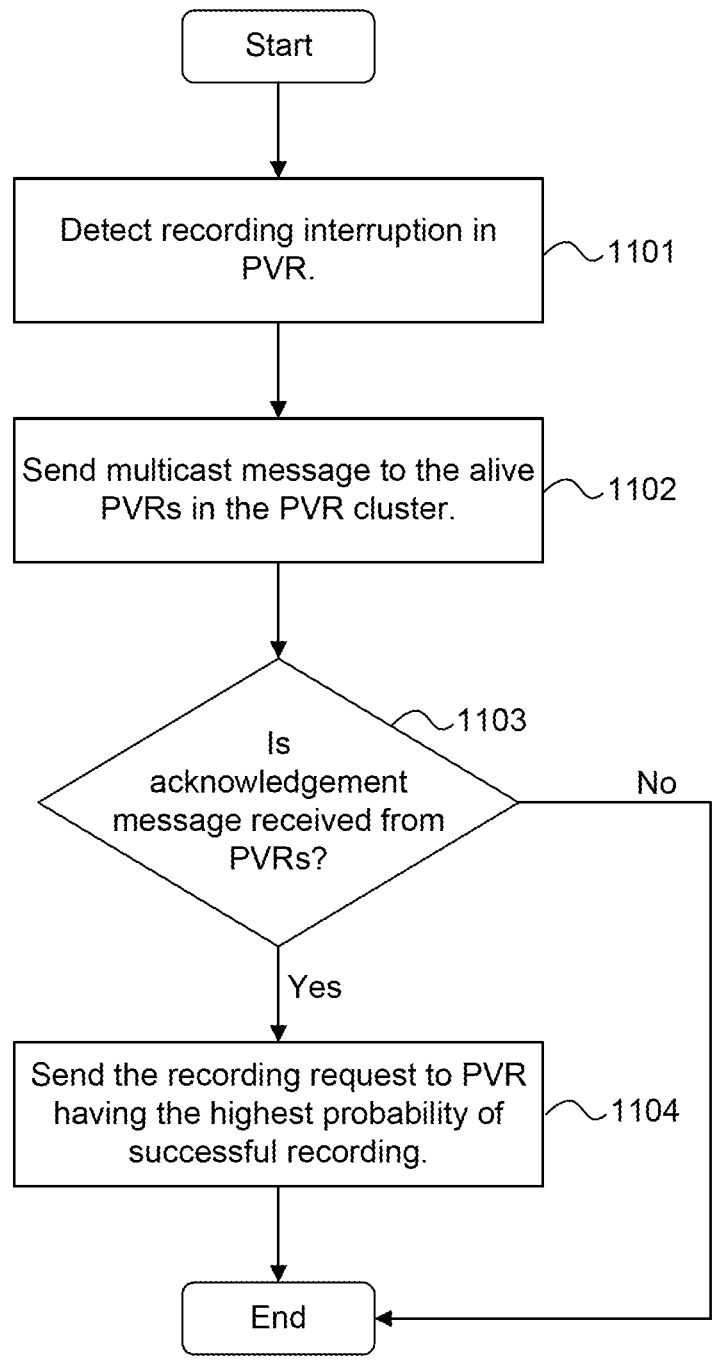

FIG. 11 illustrates another exemplary machine algorithm that may be executed by PVR cluster coordinator 101 to implement a backup recording. The machine algorithm of FIG. 11 may be substantial similar to the machine algorithm described with reference to FIG. 10 except for step 1004/1104. Accordingly, only step 1104 is discussed. In step 1104, PVR cluster tracker 201 may select the PVR 104 that has a greater probability of completing the interrupted recording successfully. For example, PVR cluster tracker 201 may calculate or may have previously calculated the success rate of recording in each PVR 104 that responded with an acknowledgement message, and use this probability value to assign the recording request to the most successful PVR. Exemplarily, the success rate may be determined using a formula such as:

$$\text{Success rate of recording in a } PVR = \frac{\text{No. of recording successfully completed}}{\text{Total no. of recordings requested}}$$

Once a PVR 104 is selected by cluster tracker 201, interrupted recording initiator 204 may send a recording request to the selected PVR 104 to take up the interrupted recording.

Figure 12:
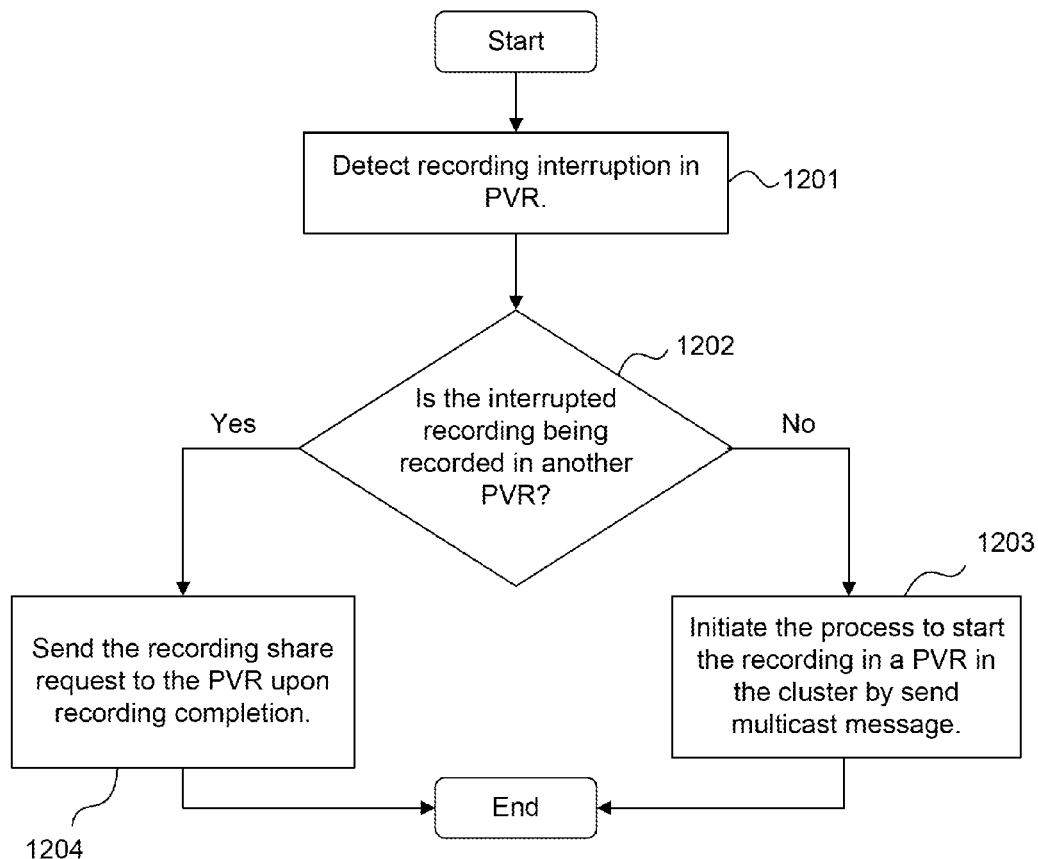

FIG. 12 illustrates another exemplary machine algorithm that may be executed by PVR cluster coordinator 101 to implement a backup recording. In step 1201, tracker 201 may receive notification of a recording interruption from is-alive message monitor 202, polling module 208, or recording failure collector 203. In response, tracker 201 may recognize an interruption in the recording at one of PVRs 104 and invoke interrupted recording initiator 204. In step 1202, tracker 201 may check whether the interrupted recording is already being recorded in a PVR 104 in the destination cluster 103. If tracker 201 determines that the interrupted recording is already being recorded in a PVR 104 in the destination cluster 103 (step 1202; YES), tracker 201 may set the PVR 104 as the serving PVR 104 and request it (via, e.g., interrupted recording initiator 204) to share its recording upon completion with the interrupted PVR 104 (step 1204). Otherwise (step 1202; NO), tracker 201 may initiate back up recording through the interrupted recording initiator 204 (step 1203). According to some embodiments, the machine algorithms of FIG. 10 or 11 may be utilized in step 1203.

It will be noted that the backup recording may occur at more than one PVR 104. For example, in some embodiments, PVR cluster coordinator 101 may initiate backup recordings simultaneously on two PVRs 104 so that if one of the PVRs 104 that were to serve as the backup recorder fails midway during the backup recording, the entire backup recording may still be obtained from the second backup recorder. In another embodiment, backup recording may be staggered over time across multiple PVRs 104. For example, consider a scenario where there are three PVRs 104 in a cluster 103. Suppose PVR 3 fails, so PVRs 1 and 2 have to take up the recording. But PVRs 1 and 2 do not have adequate space "individually" to complete the recording, though they can still complete the recording by "combining" their storage capacities. Also assume that PVR 1 and PVR 2 respond to the cluster coordinator 101 with the free storage space available. In one exemplary embodiment, PVR cluster coordinator 101 may start the interrupted recording in the PVR (for example, PVR 1) with the highest free space. In the above embodiment, coordinator 101 may reserve the storage space in PVRS 1 and 2 before initiating the backup recording. After completion of recording in PVR 1, coordinator 101 may start the recording in PVR 2. In another embodiment, no free space may be reserved, but after completion of recording in PVR 1 (the PVR with the higher storage space available for backup recording) cluster coordinator 101 may have to find a PVR 104 that is willing to take up the remaining recording. Cluster coordinator 101 may have to send a recording interrupted message again for the remaining recording.

Generally, once PVR cluster coordinator 101 initiates a backup recording, it may store the details (for example, PVR username, unique identifier with respect to cluster, cluster identifier, PVR IP address, etc.) about the PVR(s) 104 selected for the backup recording and interrupted recording (for example, program information, recorded time slot, storage location, etc.). A "recording complete" message may be sent to PVR cluster coordinator 101 by the serving PVR 104 once the interrupted recording has been completed in the serving PVR 104.

Further, the backup recording may be stored and made available to the interrupted PVR 104 in a variety of ways. According to a first technique, the backup recording may be stored locally in the serving PVR 104 and provided directly to the interrupted PVR 104 through peer-to-peer file sharing or similar technique. According to a second technique, the backup recording may be uploaded by the serving PVR 104 to PVR cluster coordinator 101 after recording is complete. PVR 104 that needs the recording may subsequently download the recording from coordinator 101. Alternatively, the serving PVR 104 may simultaneously record the interrupted recording and upload the recording to coordinator 101.

The "recording complete" message, along with interrupted recording details, may be forwarded to the interrupted PVR 104 if it is alive. If the interrupted PVR 104 is not alive (for example, due to a power outage interruption), the recording complete message may be forwarded upon receiving an is-alive message or a response to a polling message from the interrupted PVR 104. The interrupted PVR 104 may use the storage location details from the message to download the recording to its local storage.

Access to the completed recording in the serving PVR 104 may be controlled based on a recording access privilege setting of the interrupted PVR 104. The recording access privilege may be set by the user of interrupted PVR 104 and may be shared with PVR cluster coordinator. This may enable the interrupted PVR 104 to have complete ownership of the recording in the local storage of serving PVR 104. User of serving PVR 104 may have no access, full access, or restricted access to the completed recording in its local storage based on the recording access privilege setting of the interrupted PVR 104. The completed recording may be listed in the recording list of the serving PVR 104 but access to program information (program name, service name, event information, etc.) of the recording and recording playback may be based on settings such as the recording access privilege.

While exemplary machine algorithms have been described with reference to FIGS. 5-12, it will be understood that certain exemplary embodiments may change the order of steps in the machine algorithm or may even eliminate or modify certain steps. Also, in another exemplary embodiment, certain steps may be executed in parallel. Other variations to the exemplary machine algorithms set forth in FIGS. 5-12 will be apparent to a skilled artisan.

The different components of PVR cluster coordinator 101 (FIGS. 2 and 3) and PVR 104 (FIG. 4) may be embodied in hardware or software or a combination of both. The hardware may include a general-purpose computer having a central processing unit (CPU) and memory/storage devices that store data and various programs such as an operating system and one or more application programs. In some embodiment, the hardware may include a computing device having one or more processors, one or more memories, and one or more input/output (I/O) devices. In some embodiments, the computing device may take the form of a mobile computing device, general purpose computer, a mainframe computer, or any combination of these components. Alternatively, the computing device (or a system including the computing device) may be configured as a particular apparatus, embedded system, dedicated circuit, and the like based on the storage, execution, and/or implementation of the software instructions that perform one or more operations consistent with the disclosed embodiments. According to some embodiments, the computing device may comprise web server(s) or similar computing devices that generate, maintain, and provide web interface(s) consistent with disclosed embodiments. The computing device may be standalone, or it may be part of a subsystem, which may be part of a larger system. For example, the computing device may represent distributed servers that are remotely located and communicate over a network (e.g., the Internet) or a dedicated network, such as a LAN.

The processor(s) employed by the computing device may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in the computing device.

Memory employed by the computing device may include one or more storage devices configured to store instructions used by the processor(s) to perform functions related to disclosed embodiments. For example, the memory may be configured with one or more software instructions that may perform one or more operations when executed by the processor(s). Specifically, each of the steps in the above-described machine algorithms may be embodied as computer-readable instructions or code and stored in a non-transitory computer-readable storage medium for execution by a computer. The disclosed embodiments are not limited to separate programs or computers configured to perform dedicated tasks. For example, software instructions may include a single program that performs the functions of the computing device or the software instructions could comprise multiple programs. Additionally, the processor(s) may execute one or more programs located remotely from the computing device. The memory may also store data that may reflect any type of information in any format that the system may use to perform operations consistent with the disclosed embodiments.

I/O devices of the computing device may be one or more devices configured to allow data to be received and/or transmitted by the computing device. I/O devices may include one or more digital and/or analog communication devices that allow the computing device to communicate with other machines and devices, such as other components described above.

The computing device may also be communicatively connected to one or more database(s), as noted previously. The computing device may be communicatively connected to database(s) through a network. The databases may include one or more memory devices that store information and are accessed and/or managed through the computing device. By way of example, the database(s) may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, other information discussed above, etc. Systems and methods of disclosed embodiments, however, are not limited to separate databases. In some embodiments, the database(s) may be located remotely from the computing device. The databases may themselves include computing components (e.g., database management system, database server, etc.) configured to receive and process requests for data stored in memory devices of the database(s) of the computing device and to provide data from the database.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A method of implementing backup recording of events, the method being performed by a hardware processor and comprising:
   receiving, by a personal video recorder (PVR) cluster coordinator, a message indicating an interruption in a current or scheduled recording of an event at a first PVR, the message including recording information of the first PVR and an identifier of a PVR cluster corresponding to the first PVR, the PVR cluster comprising a plurality of PVRs and including the first PVR;
   determining, by the PVR cluster coordinator, the PVR cluster corresponding to the first PVR based on the identifier included in the message;
   determining, by the PVR cluster coordinator, a serving PVR in the PVR cluster for performing a backup recording of the interrupted recording based on historical success rate of recording at the serving PVR; and
   transmitting, by the PVR cluster coordinator, the recording information of the first PVR to the serving PVR to execute the backup recording of the interrupted recording at the serving PVR after receiving the message.

2. The method of claim 1, wherein the recording information is transmitted to the serving PVR when:
   an is-alive message is not received from the first PVR within a predefined time period, or
   an acknowledgment is not received from the first PVR in response to a polling message sent by the PVR cluster coordinator.

3. The method of claim 1, wherein the message further includes information about the interruption including at least one of a power outage, an insufficient signal strength, a user-initiated power-off, or a recording storage failure at the first PVR.

4. The method of claim 1, further comprising:
   transmitting a multicast message to the plurality of PVRs in the PVR cluster;
   receiving an acknowledgment from a first set of PVRs from among the plurality of PVRs in the PVR cluster;
   selecting the serving PVR from among the first set of PVRs when the first set of PVRs includes more than one PVR; and
   sending a recording request to the serving PVR to execute the backup recording.

5. The method of claim 4, wherein the serving PVR is first among the first set of PVRs to respond to the multicast message by sending the acknowledgment.

6. The method of claim 4, wherein selecting the serving PVR includes:
   determining a historical success rate of recording at each PVR in the first set of PVRs; and
   selecting the PVR that has the highest historical success rate from among the first set of PVRs as the serving PVR.

7. The method of claim 1, wherein the event is a broadcast or a broadband event.

8. The method of claim 1, further comprising:
   determining whether the interrupted recording is currently being recorded, has already been recorded, or scheduled to be recorded at a second PVR in the PVR cluster;
   setting the second PVR as the serving PVR when it is determined that second PVR has already recorded, is currently recording or scheduled to record the interrupted recording; and
   instructing the serving PVR to share the recording with the first PVR.

9. The method of claim 1,
   wherein the recording information includes at least one of scheduled recording, recording start message, recording complete message, recording deletion message, and scheduled recording cancellation.

10. A system for implementing backup recording of events, the system comprising:
    a memory storing a set of instructions; and
    one or more hardware processors configured to execute the set of instructions to:
      receive a message indicating an interruption in a recording of an event at a first PVR, the message including recording information of the first PVR and an identifier of a PVR cluster corresponding to the first PVR, the PVR cluster comprising a plurality of PVRs and including the first PVR;
      determine the PVR cluster corresponding to the first PVR based on the identifier included in the message;

determining a serving PVR in the PVR cluster for performing a backup recording of the interrupted recording based on historical success rate of recording at the serving PVR; and transmit the recording information of the first PVR to the serving PVR to execute the backup recording of the interrupted recording at the serving PVR after receiving the message.

11. The system of claim 10, wherein the one or more hardware processors are configured to execute the set of instructions to transmit the recording information to the serving PVR when:
- an is-alive message is not received from the first PVR within a predefined time period, or
- an acknowledgment is not received from the first PVR in response to a polling message sent by the PVR cluster coordinator.

12. The system of claim 10, wherein the message further includes information about the interruption including at least one of an insufficient signal strength, a user-initiated power-off, or a recording write failure at the first PVR.

13. The system of claim 10, wherein the one or more hardware processors are configured to execute the set of instructions to further perform:
- transmitting a multicast message to the plurality of PVRs in the PVR cluster;
- receiving an acknowledgment from a first set of PVRs from among the plurality of PVRs in the PVR cluster;
- selecting the serving PVR from among the first set of PVRs when the first set of PVRs includes more than one PVR; and
- sending a recording request to the serving PVR to execute the backup recording.

14. The system of claim 13, wherein the serving PVR is first among the first set of PVRs to respond to the multicast message by sending the acknowledgment.

15. The system of claim 13, wherein selecting the serving PVR includes the one or more hardware processors being configured to execute the set of instructions to perform:
- determining a historical success rate of recording at each PVR in the first set of PVRs; and
- selecting the PVR that has the highest historical success rate of from among the first set of PVRs as the serving PVR.

16. The system of claim 10, wherein the event is a broadcast or a broadband event.

17. The system of claim 10, wherein the one or more hardware processors are configured to execute the set of instructions to further perform:
- determining whether the interrupted recording is currently being recorded, has already been recorded, or scheduled to be recorded at a second PVR in the PVR cluster;
- setting the second PVR as the serving PVR when it is determined that second PVR has already recorded, is currently recording or scheduled to record the interrupted recording; and
- instructing the serving PVR to share the recording with the first PVR.

18. The system of claim 10, wherein:
the recording information includes at least one of scheduled recording, recording start message, recording complete message, recording deletion message, and scheduled recording cancellation.

19. A non-transitory computer-readable storage medium storing instructions that, when executed by a hardware processor of a personal video recorder (PVR) cluster coordinator, causes the hardware processor to perform operations comprising:
receiving a message indicating an interruption in a current or scheduled recording of an event at a first PVR, the message including recording information of the first PVR and an identifier of a PVR cluster corresponding to the first PVR, the PVR cluster comprising a plurality of PVRs and including the first PVR;
determining the PVR cluster corresponding to the first PVR based on the identifier included in the message;
determining, by the PVR cluster coordinator, a serving PVR in the PVR cluster for performing a backup recording of the interrupted recording based on historical success rate of recording at the serving PVR; and
transmitting the recording information of the first PVR to the serving PVR to execute the backup recording of the interrupted recording at the serving PVR after receiving the message.

20. The non-transitory computer-readable storage medium of claim 19, wherein the recording information is transmitted to the serving PVR when:
- an is-alive message is not received from the first PVR within a predefined time period, or
- an acknowledgment is not received from the first PVR in response to a polling message sent by the PVR cluster coordinator.

* * * * *